United States Patent [19]

Blowes et al.

[11] Patent Number: 5,514,279
[45] Date of Patent: * May 7, 1996

[54] SYSTEM FOR TREATING CONTAMINATED GROUNDWATER

[75] Inventors: David W. Blowes; Carol J. Ptacek, both of Waterloo, Canada

[73] Assignee: University of Waterloo, Waterloo, Canada

[*] Notice: The portion of the term of this patent subsequent to Mar. 3, 2012, has been disclaimed.

[21] Appl. No.: 329,876

[22] Filed: Oct. 27, 1994

Related U.S. Application Data

[63] Continuation-in-part of Ser. No. 845,132, Mar. 3, 1992, Pat. No. 5,362,394.

[30] Foreign Application Priority Data

Mar. 4, 1991 [GB] United Kingdom .................. 91/04509

[51] Int. Cl.$^6$ ........................................ C07F 1/58
[52] U.S. Cl. .................. 210/617; 210/719; 210/720; 210/721; 210/747
[58] Field of Search .................. 210/615, 616, 210/617, 631, 747, 702, 719, 720, 721, 722, 757, 758, 170, 901, 605

[56] References Cited

U.S. PATENT DOCUMENTS

| | | | |
|---|---|---|---|
| 4,122,012 | 10/1978 | Vlasnik | 210/170 |
| 4,401,569 | 8/1983 | Jhaveri et al. | 210/747 |
| 4,473,477 | 9/1984 | Beall | 210/747 |
| 4,576,717 | 3/1986 | Collin et al. | 210/747 |
| 4,664,809 | 5/1987 | Fenton | 210/747 |
| 4,683,064 | 7/1987 | Hallberg et al. | 210/747 |
| 4,839,051 | 6/1989 | Higa | 210/747 |
| 5,057,227 | 10/1991 | Cohen | 210/747 |
| 5,266,213 | 11/1993 | Gillham | 210/747 |
| 5,330,651 | 7/1994 | Robertson | 210/617 |

FOREIGN PATENT DOCUMENTS

| | | |
|---|---|---|
| 1054728 | 5/1979 | Canada . |
| 0383109 | 8/1990 | European Pat. Off. . |
| 1934170 | 1/1971 | Germany . |
| 8401772 | 1/1986 | Netherlands . |
| 2185901 | 8/1987 | United Kingdom . |
| 2219617 | 12/1989 | United Kingdom . |
| 9108176 | 6/1991 | WIPO . |

OTHER PUBLICATIONS

"New Approach to In–Situ Treatment of Contaminated Groundwaters" D. C. McMurtry + R. O. Elton Publication Journal: Environmental Progress (vol. 4, No. 3), Aug. 1985.
Nirei et al. "Management of Environmental Resources and Development of the Kanto Paleo Submanic Basin", 29th IGC Field Trip, pp. A12.1–A12.34, 1992.

*Primary Examiner*—Christopher Upton
*Attorney, Agent, or Firm*—Anthony Asquith & Co.

[57] ABSTRACT

A system for treating groundwater contaminated with acidity or other contaminants is disclosed. The system involves excavating a trench into the aquifer in the path of the contaminant plume, and placing a body of active material in the trench. The active material depends on the particular contaminant: organic carbon may be used when the contaminant is ferrous sulphate, or hexavalent uranium oxide, or dissolved nitrate; pyrite or elemental iron may be used when the contaminant is eg chromium oxide. The active material causes the contaminant, by chemical reaction, to change its oxidation-reduction state, and to precipitate harmlessly in the body of material.

30 Claims, 3 Drawing Sheets

5,514,279

SYSTEM FOR TREATING CONTAMINATED GROUNDWATER

This application is a continuation-in-part of application Ser. No. 07/845,132, filed Mar. 3, 1992, now U.S. Pat. No. 5,362,394.

This invention relates to the treatment of groundwater for the purpose of removing water-borne contaminants.

BACKGROUND TO THE INVENTION

Groundwater in its native aquifer may contain many kinds of contamination. As will become clear, the invention may be used against a variety of contaminants, but the invention will be described mainly as it relates to the treatment of the kinds of contaminants emanating from the tailings impoundments associated with mine workings.

The conventional manner by which such contaminants have been treated has involved removing the groundwater from the aquifer and treating the water, at an above-ground treatment facility, with such filters, chemicals, etc as may be required. The treated water may be allowed to re-enter the aquifer, or the water may be led away to a stream or other drainage means.

With the different kinds of conventional treatment process, the process may be such as to break down the contaminant and render it harmless, or the process may simply extract the materials from the water, leaving the contaminant material itself intact, in which case the material still may constitute a hazard; the former type of process of course is to be preferred.

Removing groundwater from its native aquifer on a large scale is enormously expensive. The invention is aimed at providing a practical economical system whereby groundwater may be treated against a wide variety of contaminants while the water remains in-situ, ie within its native aquifer.

THE GENERAL FEATURES OF THE INVENTION

In practising the invention, first a contaminant is identified, and a plume of the contaminant is mapped: its extent, its depth, velocity, and other characteristics are noted. In the invention, a trench or other receptacle is excavated in the material of the aquifer. Into the excavation is placed a body of biologically or chemically active material; active, that is to say, with respect to the particular contaminant. The nature of the material to be placed in the excavation depends on the nature of the contaminant which it is desired to treat, and specific examples will be discussed below.

The location and extent of the trench and of the active material placed therein are such that the plume of contaminant passes through the material. The invention thus provides a wall or curtain of active material through which the plume passes.

In the invention, the permeability of the active material placed within the trench is such that the groundwater is not adversely impeded in its flow through the material and through the trench. The flowing groundwater passes through what amounts to a curtain comprised of the active material, and the curtain should not itself constitute a barrier which would divert flow away from the curtain.

An aquifer which contains flowing groundwater generally includes a sand/gravel component, and has a substantial permeability; the active material placed within the trench preferably should provide no more of a restriction against the flow of groundwater than does the surrounding aquifer material.

In the invention, the said active material preferably is active in the sense that the material promotes, or participates in, the actual chemical or biochemical breakdown or transformation of the contaminant. It is less preferred, in the invention, to provide a body of material in the excavated receptacle, which functioned simply as a filter, for example, or in some other chemically quite passive manner which left the contaminant intact. The invention includes within its broad scope the use of a material that is active in the sense that the presence of the material causes the contaminant to adopt a less soluble form, whereby the contaminant precipitates onto, or can be adsorbed onto, the material. However, the preferred manner of practising the invention lies in providing a material that is active in the sense that the material causes or supports the chemical breakdown or transformation of the contaminant to a less soluble phase.

In this specification, "transformation" is a general term that refers to a change of an inorganic or organic chemical species or compound to a different form, such as occurs during a reduction or oxidation reaction. The term "breakdown" is used to represent more extreme reactions that are irreversible and that may lead to the complete or partial decomposition of a compound.

A major factor in the invention is that the water remains in the ground; not only does this mean that the expense of taking the water out of the ground is avoided, but it means also that the water is not exposed to the atmosphere—neither prior to, nor during, treatment. The invention is therefore particularly useful in regard to those chemical and biological processes that require to take place under anaerobic conditions.

The invention is also particularly useful in regard to the treatment of contaminants such as gasoline in the groundwater, which are volatile and will escape into the atmosphere if the water is exposed. The substances which enter the atmosphere from such volatiles can often be carcinogenic. Breaking down those contaminants below ground, before exposure, is much to be preferred.

The invention may, however, be applied to the promotion of in-ground reactions where the reaction itself is not affected by whether or not it takes place underground: the benefit in that case is the great saving in expense, through not having to take the water out of the ground. It may be regarded that in the invention no pump is required to move the water through the treatment facility because gravity and natural groundwater movements constitute a "natural pump". The invention provides a means whereby advantage can be taken of the "natural pump".

It may be noted that the "natural pump" effect as just described arises because of the lie of the land, and the nature of the source of, and the destination of, the groundwater passing through the aquifer. One factor that may affect the "natural pump" is the presence of a well, even though of course the well is not itself natural. A municipal water-supply well, for example, can affect the level of the water table and the magnitude and direction of groundwater velocities in fact for miles around the well.

Once the active material is placed in a trench or excavation, as in the invention, it may usually be assumed that the material will never be removed therefrom (although planned removal may be required with some contaminants, in some cases). This aspect may be contrasted with treatment systems which take place above ground. Above ground, not only is it the case that many of the operational parameters are under the close control of the engineers, but especially it is the case, when the treatment is above ground, that the material through which the groundwater passes can be removed and disposed of, and replaced with fresh material.

It is recognised that if the groundwater contaminant is to be treated by passing the groundwater through material contained in an in-ground trench, as in the invention, then the material placed in the trench preferably should not be material that simply acts to withdraw the contaminant from the groundwater—by adsorption for example—without breaking down or transforming the contaminant. An adsorption process is more appropriate for above-ground treatments, where, when the contaminant has built up upon the material, the material can be disposed of, and fresh material added.

However, it may be noted that in the preferred form of the invention, wherein the material acts to promote or cause an actual chemical breakdown, or oxidation/reduction transformation or transformation to a less soluble state, of the contaminant, an adsorbent material can be added into the trench, and mixed with the chemically-active material in the trench; the adsorbent material serves to slow down the velocity of the contaminant through the trench, thereby increasing the residence time of the contaminant in the trench, and thereby enhancing the completeness of the breakdown or transformation of the contaminant by the active material.

As mentioned, the material to be placed in the trench preferably is not a mere adsorber of the contaminant. Adsorption by itself is not preferred for in-ground treatment. If an adsorbent were to be used, and if the contaminant were indefinite in extent, as time goes by the adsorption capacity of the adsorbent would be exceeded, and would lose its effectiveness; if, on the other hand, the contaminant plume were known to be of limited extent, and that clean water was following behind the plume, the contaminant that was adsorbed when the concentrated plume passed through the adsorbent might gradually be released into the cleaner water that followed.

It should be noted that when the invention is used in the preferred applications, in fact there are no contaminants and toxic substances to be disposed of.

It can happen, as a substance is precipitated onto a material, that the material becomes less porous. In the invention, the selection of the material, in relation to the contaminant, should be such that precipitants do not cause the material to become significantly less permeable than the material of the surrounding aquifer, since then the plume of contaminated groundwater would tend to divert around the curtain.

Many precipitant substances in fact do tend to accumulate in the crannies in the curtain of material in the trench; where this is envisaged, the engineer should take care to mix the active material with a good proportion of sand/gravel, or the like, to ensure that the porosity of the curtain remains always less than the porosity of the aquifer material.

As a general rule, it is always easier for the engineer to control a reaction that is taking place above ground than a reaction taking place in-ground or underground. In-ground, the temperature cannot practically be adjusted, nor can the pH, nor many other factors which are simple enough to monitor and adjust at an above-ground treatment facility. However, it is recognised in the invention that certain chemical and micro-biological reactions and processes can be caused to happen underground, and can be made to cause the breakdown of groundwater-borne contaminants.

DETAILED DESCRIPTION OF PREFERRED EMBODIMENT

By way of further explanation of the invention, an exemplary embodiment of the invention will now be described with reference to the accompanying drawings, in which.

The systems shown in the accompanying drawings and described below are examples which embody the invention. It should be noted that the scope of the invention is defined by the accompanying claims, and not necessarily by specific features of exemplary embodiments.

Figure 1:
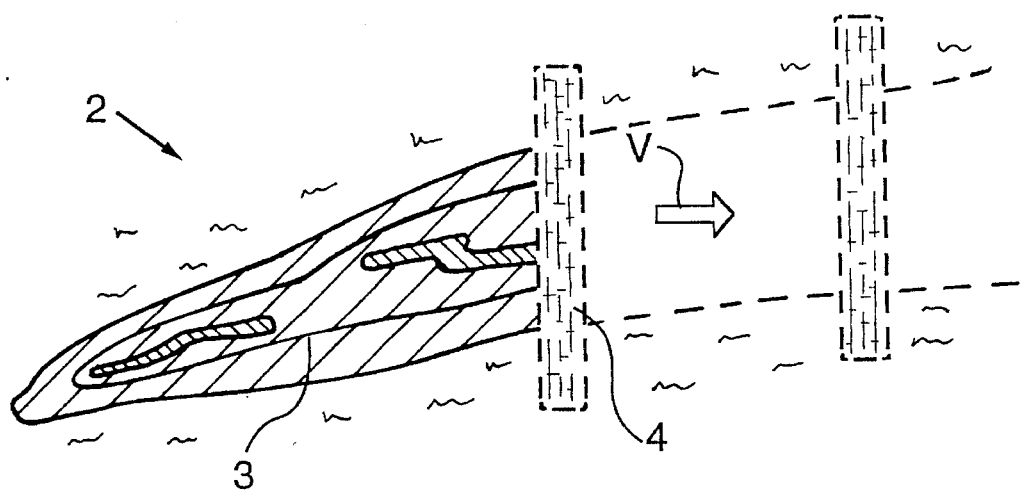
FIG. 1 is a plan view of an aquifer, in which the treatment system of the invention has been included.

The kind of aquifer 2 with which the invention is concerned usually comprises, or includes, sand/gravel or the like, and is permeable to groundwater. Natural groundwater pressure gradients exist in the aquifer, whereby the groundwater naturally moves through the aquifer at a characteristic velocity V, in a characteristic direction, as shown in FIG. 1. Under natural conditions the moving groundwater usually is heading towards a river or stream, although the presence of a well or other water draw-off agency can affect the natural flow.

When it is determined that the groundwater is contaminated, the engineer carries out test-borings and other measurements to determine the extent of the plume 3, the nature and concentration of the contaminants therein, the direction and velocity of the flow of groundwater, to what extent the movement of the contaminants is retarded relative to the groundwater, and so forth. He also notes the level of the water table, and takes account of seasonal variations in precipitation, etc. From these measurements, the engineer determines the best location in which to place the wall or curtain of active material, the engineer's intention being to ensure that substantially all of the contaminated water, in all seasons, passes through the curtain.

The wall 4 of active material, in the case illustrated in FIG. 1, is located in a trench 5 which has been excavated down vertically into the material 2 of the aquifer.

The invention is particularly useful when the requirement is that the body of active material 4 is to be held under anaerobic conditions—in order for the reaction to take place which will lead to the breakdown or treatment of the contaminant. Generally, in such cases, any portion of the active material which happens to be exposed to air will simply oxidize, and thus be wasted as regards its ability to affect the contaminant. Therefore, the material must be isolated from exposure to the atmosphere.

Figure 2:
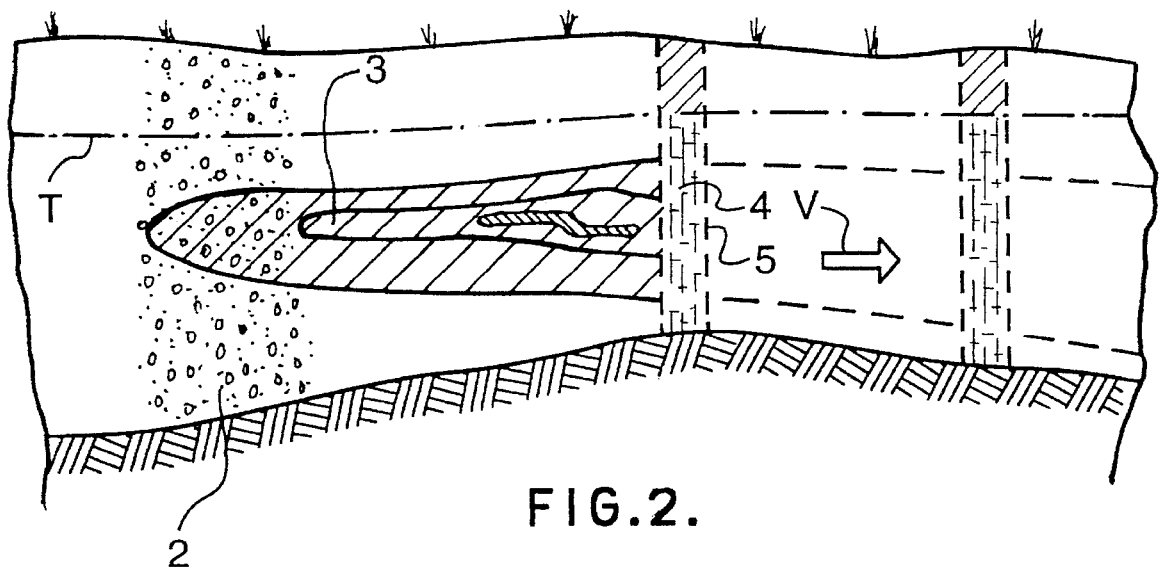
FIG. 2 is a vertical cross-section of the aquifer of FIG. 1.

One of the simplest ways of keeping the body of active material anaerobic is to place the body of active material below the water table T (in FIG. 2). It may be noted that the level of the water table will vary, and due allowance should be made for that, if the active material is not to be allowed to come in contact with the air: on the other hand, generally the body of active material would not be unduly affected by a short-lived exposure, say due to a seasonal drought.

A tailings impoundment 7 (FIG. 3) for a mine may occupy many hectares, and may be several meters deep. While the mine is being worked, generally the tailings will remain under water. When the tailings impoundment is finished with, the water table in the region of the impoundment gradually falls: the final equilibrium position of the water table is shown at TF.

As shown, the tailings impoundment 7 contains a large proportion of ferrous sulphide (pyrite). The pyrite forms a body 9 through which passes rainwater and other precipitation. If the body of pyrite remains under water (as it was when the tailings were dumped) no oxygen can get to the pyrite; the pyrite in this case remains inactive and water that passes through submerged pyrite tends not to pick up any acidity.

However, if the body of pyrite 9 becomes exposed to the atmosphere, the ferrous sulphides start to oxidise, releasing ferrous iron and sulphate. Other metals may also be released due to oxidation, such as zinc, lead, copper, arsenic, mercury, cobalt, nickel, and selenium. Run-off water that has passed through the body 9 of dumped tailings therefore now contains for example ferrous iron, which, particularly later, when the water enters a stream or river, may lead to the water becoming more acidic than can be tolerated.

When the pyrite in the tailings is under water, the pyrite cannot oxidise, and precipitation water infiltrates and passes through the submerged tailings substantially without being affected. But when the precipitation water passes through tailings that have been exposed to the atmosphere, the run-off water picks up ferrous iron. When such water is exposed, further reactions take place which increase its acidity.

It is recognised that run-off water that has passed through exposed tailings should be treated preferably while the water is still in the aquifer, and before it can reach the atmosphere, and before it can enter a river or stream.

It has been proposed (GB-221961 7-A, Blowes et al, December, 1989) that water that has been contaminated in this way can be treated by passing the water through a body of organic carbon. Under the right conditions, the potential acidity can be removed by biological/bio-chemical reactions, in which the sulphate ion is reduced to a sulphide ion. These sulphide ions then form metal sulphide compounds, which readily precipitate out. The precipitated sulphides thus remove dissolved metals, such as iron, zinc, lead, arsenic, mercury, etc, from the groundwater, which lessens both the potential for acid generation and the potential for the release of toxic metals into streams and rivers. The precipitated sulphides are harmless so long as they are never exposed to the atmosphere (just like the sulphides in the original body of tailings).

The reduction of the sulphate ions which takes place in the presence of the organic carbon is a predominantly microbiological reaction. The micro-organisms which are effective to reduce sulphate ions are viable only under strictly anaerobic conditions, and therefore it is essential that the organic carbon, and the water, remain isolated from atmospheric oxygen.

Figure 3:
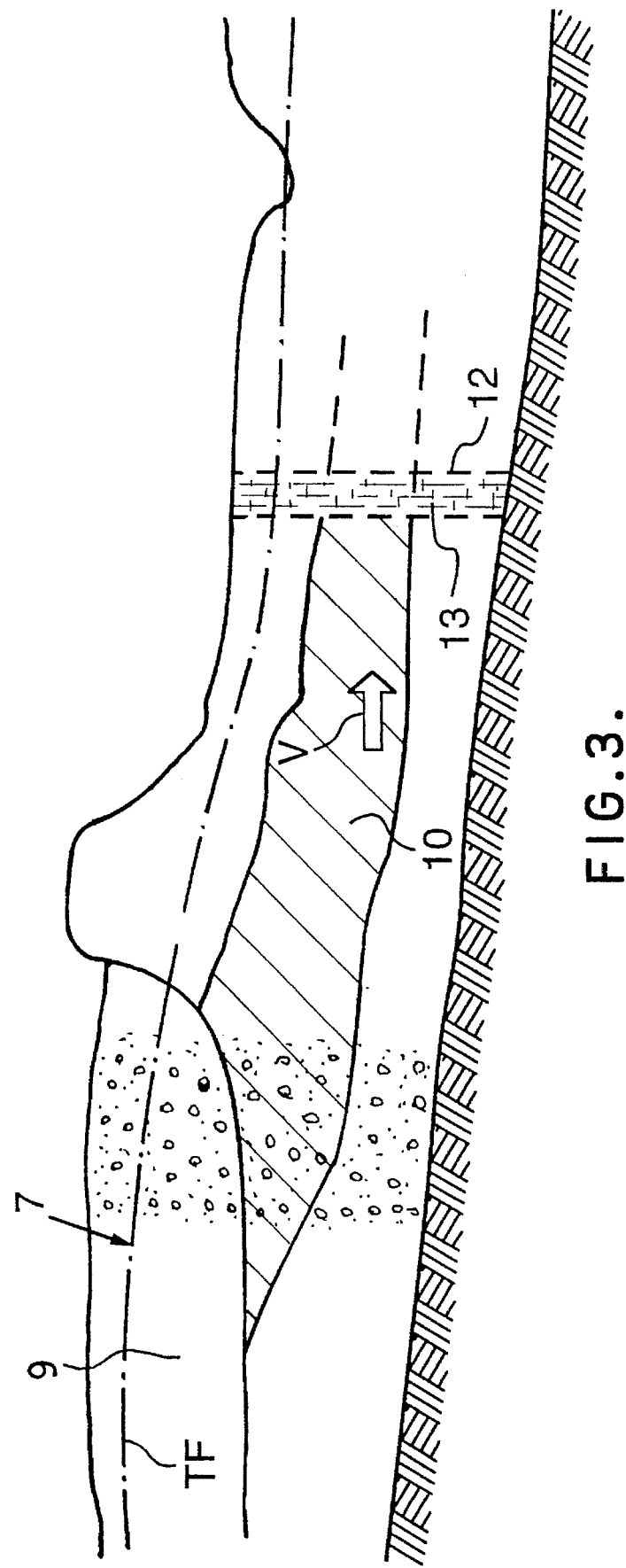
FIG. 3 is a cross-section corresponding to FIG. 2, but shows another aquifer, and shows also a tailings impoundment.

In FIG. 3, a portion of the body 9 of tailings has become exposed, and it has been determined that run-through water emerging from the body of tailings is contaminated. The extent, velocity, depth, etc of the plume 10 of contaminated run-through water is mapped, as previously described.

A trench 12 is excavated in the path of the plume 10. A body 13 of organic carbon is placed in the trench. The arrangement of the trench and of the organic carbon is such that substantially all the contaminated water passes through the organic carbon.

The permeability of the body of organic carbon 13 should be such that the water is not prevented from flowing through the body of carbon: generally, the permeability of the body of organic carbon should not be lower than the permeability of the surrounding aquifer material. The invention provides a curtain of active material. It is important in the invention that the curtain should not act as a barrier; the curtain should not, or at least not to any substantial degree, tend to divert the flow of water in the aquifer around, as opposed to through, the curtain.

The organic carbon may be in such form as is readily accessible at the site. Sometimes, wood from local trees will be suitable. The wood should be chopped into small pieces, of say 1 to 5 cu cm volume, to best promote the biological reactions.

It is an advantage of the system as described that, since the trench is excavated down into the aquifer material, it is simple matter to ensure that the groundwater, in passing through the trench, remains just as isolated from the atmosphere as if the trench were not there. The system not only avoids the expense of removing the groundwater from the aquifer; the system can avoid also the chance of exposing the water to the air.

The quantity of wood needed to treat the water can be quite large. In the case of the pyrite tailings, theoretically, the mass of wood needed can be as large as the mass of the tailings; but often the most adverse forms of the reactions are not present, and less wood can be provided than the theoretical maximum.

Sometimes, wood is not the most suitable source of organic carbon for the treatment of water that has been contaminated by passing through exposed sulphides. Other sources include seaweed, organic refuse, etc. The engineer needs to see to it that suitable conditions of temperature, pH, quantity and type of organic carbon, etc are provided for the micro-organisms.

The water that emerges from the curtain may be tested to determine how successful the curtain has been in removing the contaminant. If it turns out that some contaminant is still present in the emerging water, a further trench may be excavated downstream, in the path of the emerging water.

This aspect of the procedure can lead to economies. The treatment procedure as described involves excavating the material of the aquifer, placing a body of active material in the excavation, and passing the groundwater through the said body of active material. A certain mass of active material obviously is needed to properly treat the water: too little active material and not all the water will be treated; too much active material and the procedure is not economical. On the other hand, the treatment reactions sometimes can proceed in a number of different ways, some of which can require a greater mass of active material than others.

In some types of treatment systems (eg the Blowes system referred to above), it is so difficult to go back afterwards to add more active material that the engineer is justified in providing substantially more active material than the theoretical minimum quantity. This ensures a margin to allow for unforeseen adverse reactions and conditions.

But the treatment system as described herein can be very economical from the standpoint that its designer need only provide the theoretical minimum quantity of active material; if it turns out that more material than the strict minimum is needed, the engineer later simply excavates another trench, and creates a second curtain of active material in series with the first curtain. The extra cost of returning later and excavating a second trench and providing the second curtain is hardly any more expensive than providing that second curtain simultaneously with the first curtain. Therefore, there is little cost to the engineer in deferring the decision whether to provide the second curtain at all. Any extra costs associated with delaying are more than offset by the fact that the first curtain now need contain only a minimum quantity of active material. Often the engineer will be able to get away with only that minimum quantity. It is not difficult for the engineer to determine how successful the treatment due to the first curtain has been.

Alternatively, it can be decided beforehand to provide a second curtain in any event. The second curtain may, for example, contain a different active material which must not, for some reason, be mixed with the first active material.

Also, the ability of the active material to treat the water may deteriorate with time. If further active material is needed, the engineer may decide to create a new excavation and a new curtain, or to remove the spent active material from the first excavation. It will generally be no more expensive to excavate a fresh trench in the aquifer material than to extract and replace the spent material out of the initial trench.

Sometimes, it will be known in advance what the maximum quantity of contaminant is: for example when it is required to clean up a known quantity of a contaminant liquid that has accidentally been spilled on, or leaked into, the ground. On other occasions, as in the case of the tailings pond as described, the quantity of the contaminant, and how long the plume of the contaminant will continue to be renewed, is unknown; and sometimes it will turn out later that the contamination should have been addressed in some other way, such as by pumping and surface treatment.

The advantage of the treatment procedure described is that the procedure is very flexible as regards the ability of the engineer to add further treatment steps later, if such steps should turn out to be required. The nature of the treatment procedure described is such that it is hardly more expensive in aggregate later to add further curtains of active material at a particular site than it would have been to build a large curtain originally. Thus, only a short-term minimum treatment facility need be provided at any particular stage. In this sense the treatment system is modular, in that the system may be expanded in stages, as required, and each step is independently operational.

The system as described in relation to FIG. 3 is intended to treat water that has passed through exposed pyrite (ferrous sulphide) and which has consequently picked up potential acidity. In fact, $FeS_2$ is a reductant itself, and in cases where the contaminant is the kind that will be broken down by the action of any strong reductant, the body of active material placed in the excavation, in the path of the plume, may be a body of pyrite. For the reasons already described, the pyrite in the excavation of course must be kept from contact with the atmosphere. If native iron is available, that too can serve as a reductant.

Oxidation of pyrite used in these reduction reactions tends to produce acidity. To alleviate this, the pyrite can be mixed with a pH-buffering material such as calcite $CaCO_3$, which serves to advantageously raise the pH of the treated groundwater that emerges from the curtain.

The invention may also be utilised in the case where the breakdown of the contaminant lies in oxidising the contaminant, rather than reducing it. In this case, the reaction is promoted by an excess of oxidants in the water. The (porous) body of active material in such a case may comprise or include such oxidants as $Fe(OH)_3$ or $MnO_2$.

The invention may be utilised in some cases where the contaminant is a relatively electro-active chemical, such as an oxide of chromium, selenium, arsenic, or manganese. Here the wall or curtain (FIG. 4) may include a body of $FeS_2$, native iron, or other reductant. A matrix of calcite may be included in the curtain to raise the pH of the emerging groundwater; a second trench may be provided down-gradient for containing the calcite.

The effect is that the metals are precipitated out as hydroxides, on or near one of the curtains. These insoluble hydroxides then remain (harmlessly) stationary where they were deposited.

Figure 4:
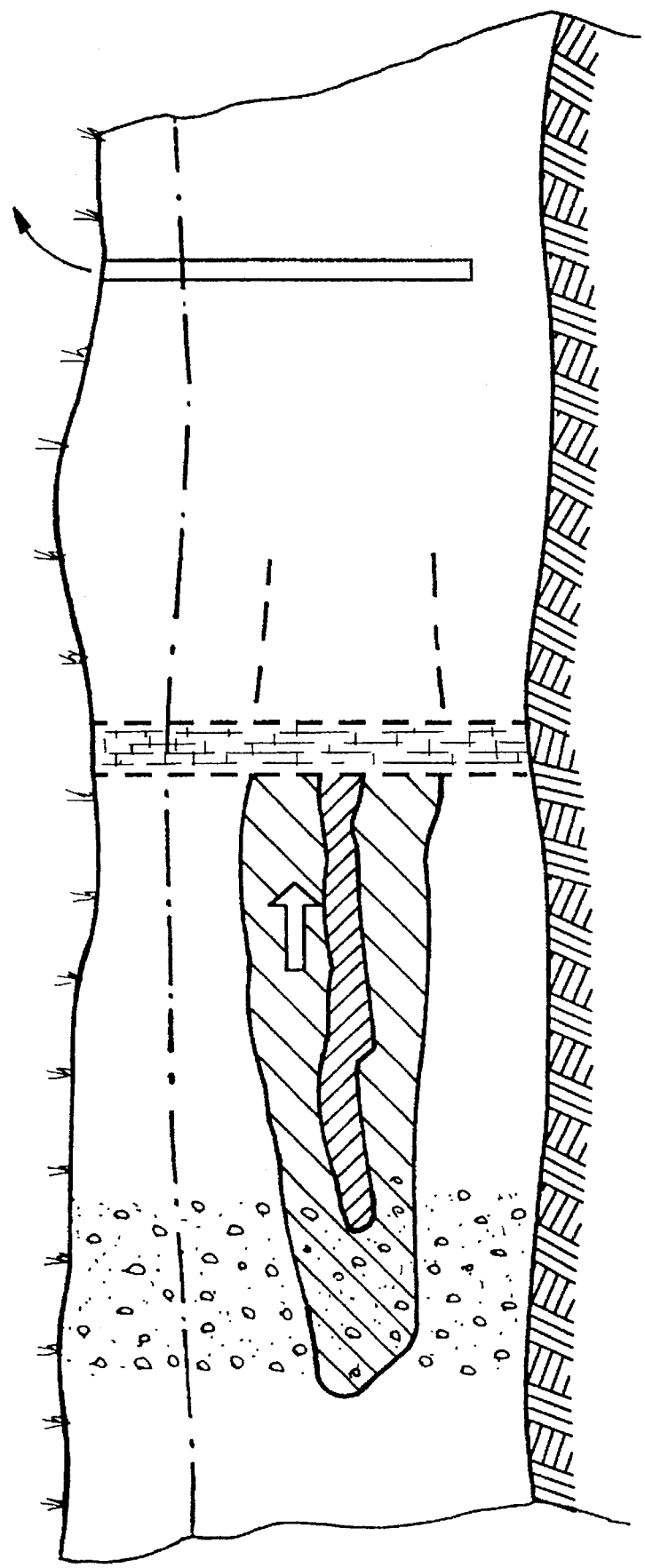
FIG. 4 is a cross-section corresponding to FIG. 2, but shows another aquifer.

It may be noted from FIG. 4 that a pumping well may be placed downstream from the curtain. Such a well can be useful if, for example, it becomes desirable to create a pressure gradient below ground to draw the plume into the curtain. (It may be noted that the expense of providing a pumping well in combination with the trench is small compared with the expense of pumping the contaminated water out of the ground for treatment at the surface.)

The system provides a porous wall or curtain of chemically or biochemically active material, which is installed in the path of a plume of contaminant travelling, below ground, in an aquifer. The porous wall is installed in a receptacle (ie a trench) which has been excavated down into the material of the aquifer. The porous material within the receptacle may comprise an oxidant or a reductant, depending on the nature of the contaminant. When the active material is a reductant, it is important that the material be isolated from atmospheric oxygen; preferably, the receptacle is so disposed that the active material lies below the water table.

The invention involves an adjustment of the reduction-oxidation (redox) potential of in-ground groundwater by passing the water through the curtain of porous active material. Whether the active material is an oxidant or a reductant, a key benefit of the invention is that the treatment is carried out in-situ, ie without the water having to be taken out of the ground.

Although the material placed in the receptacle is chemically or biochemically active, the system as a whole is virtually completely passive, in the sense that no persons or facilities are required to "operate" the system in any way (except for operating the optional pumping well, if that is provided, as shown in FIG. 4).

Although the invention can be viewed broadly as encompassing any adjustment of redox potential, for treatment of a whole range of contaminants, the invention is of particular usefulness in the elimination of potential acidity in the groundwater that has passed through exposed pyrite. The preferred active material in this case is organic carbon.

Most mine tailings impoundments, as a matter of historical fact, contain no provision in the impoundment for preventing acidity arising from ferrous iron from entering the effluent groundwater, and it is virtually out of the question on cost grounds now to go back and mix an active chemical substance into the body of tailings within the impoundment in any kind of effective large-scale manner.

It may be regarded that the invention takes advantage of the fact that the groundwater is moving through the ground with a natural velocity: in a sense, in the invention, the groundwater automatically "presents itself" to the curtain for treatment, and the invention therefore avoids the vast expense either of getting at the water for treatment within the impoundment or of removing the groundwater from the ground for treatment.

Besides this advantage, notwithstanding the fact that the systems as described are operationally passive, the invention can provide that the contaminant is removed from the groundwater and precipitated as relatively insoluble substances. Equally, the substances produced as a result of the breakdown of the contaminant may include harmless gases such as carbon dioxide.

The trench or other receptacle which is excavated down into the aquifer material should be of such an extent that the whole plume of contaminant passes through the active material. In a typical case, the trench might be say 50 meters long. In another case, it might be 2 km long. Generally, the trench and the curtain preferably should go down to the bottom of the affected aquifer, ie down to the impervious bedrock, clay etc, which lies below the sand/gravel etc of the aquifer, or down below the depth of the aquifer affected by the contamination.

Depending on the nature of the contaminant, its velocity and other parameters, it may be preferred in a particular case for the curtain to encircle the contaminant plume.

The manner of excavating the trench or receptacle will be determined mainly by such factors as the nature of the aquifer material, the accessibility of the site to heavy equipment, and so on. Usually, a trench can be excavated into an aquifer material down to an adequate depth (20 or 30 meters, if necessary) using a back-hoe type of excavating machine. In this case, the width of the trench will be determined by the width of the hoe bucket. Aquifer materials are not generally self supporting, especially below the water table, so that it is preferable to use those kinds of trenching techniques in which the fill-in material is installed in the same pass as the digging movement of the bucket.

Small local cave-ins which result in mixing of the aquifer material with the active material are not important: there is no particular need to maintain a sharp demarcation between the body of active material in the trench and the material of the surrounding aquifer. Cave-ins, which might occur while trenching, can be a problem in that a cave-in might exclude the active material from an area of the trench, to the extent that the engineer might fear that the curtain has holes in it; in that case he can specify that a more porous active material be used: thus the groundwater will tend to pass preferentially through the curtain than through the holes in the curtain.

In an alternative technique for excavating the trench, two spaced-apart walls may be pile-driven into the aquifer material; the aquifer material may then be removed from between the walls, and replaced with the active material.

Three examples will now be given of practical groundwater treatment situations.

In each example, the plume of contaminated water occupies a volume which is 500 m long, 50 m wide, and 30 m deep. (The "long" dimension represents the direction of the velocity of the plume.) The porosity etc of the aquifer is such that the aquifer contains 30%, by volume, of groundwater. Thus the volume of contaminated groundwater is 225 million liters, ie 225,000 cu meters.

In each example, the active material is placed in a trench which is excavated in the path of the plume, and which extends over the full cross-sectional extent of the plume, ie the trench is 50 m wide by 30 m deep.

The trench, in the examples, has to be 50 m by 30 m deep to cover the whole plume. Such a trench is generally dug by means of a back-hoe excavator, and the bucket of a machine capable of digging down 30 meters typically is 1 meter wide. Therefore the practical minimum width for the trench is 1 meter, ie the width of the bucket. Thus it is not practical to provide a trench that is narrower than 1 meter—at least, not if the trench is to be dug using a conventional back-hoe excavator.

It is of course possible to make a trench that is wider than the width of the bucket. However, an aquifer material generally consists of sand and gravel, saturated with water. Such a material is quite incapable of supporting the (vertical) walls of a trench. Therefore, the technique used for making a trench in a typical aquifer material generally involves a means for placing the filler material into the trench at the same time as the trench is being dug, whereby the aquifer material never becomes voided.

It follows, in such a technique, that it is no more practical to make the trench wider than the bucket than it would be to dig a separate trench. Therefore, in practical terms, in a trench dug in an aquifer material, the width of the trench is constrained to be the width of the bucket, no more and no less.

Of course, if the trench is created using pile-driven sheeting, and then removing the aquifer material from between the sheeting, the constraints on width are removed. However, using pile-driven sheeting is much more expensive.

The width of the trench, in the Examples, therefore preferably is the width of the bucket, typically 1 meter. The volume of the 50 m by 30 m trench therefore is 1500 cubic meters.

EXAMPLE 1

Groundwater Contaminated with Chromium Oxide

Reduction of Contaminant by Iron Pyrite

The contaminated groundwater contains a concentration of, as a typical example, 10 milligrams of chromium (in the form of soluble chromium oxide, $Cr_2O_7$—) per liter of water. The total mass of the chromium in the whole plume is 2250 kg, ie 2.25 tonnes, of Cr.

The relevant reaction to reduce Cr by pyrite can be represented by:

$$5Cr_2O_7\!-\!+2FeS_2+19H_2O \rightarrow 4SO_4\!-\!+2OH\!-\!+10Cr(OH)_3+2Fe(OH)_3$$

In this reaction, 1 mole of $Cr_2O_7$— is reduced to $Cr\!+\!+\!+$, which precipitates as $Cr(OH)_3$ upon reaction with $2/5$ moles of iron pyrite ($FeS_2$).

It follows that the mass of iron pyrite that is needed to reduce 2.25 tonnes of chromium is 1.04 tonnes of pyrite. If elemental iron is available it may be used as the reductant

EXAMPLE 2

Groundwater Contaminated by Ferrous Sulphate

Reduction by Organic Carbon and Bacteria

The contaminated groundwater (which may be run-off from eg a mine tailings pond) contains a concentration of, say 2000 mg of ferrous iron, and 3500 mg of sulphate, per liter of groundwater. Thus, the total mass of ferrous sulphate in the exemplary plume (225 million liters) is 1230 tonnes.

The relevant reaction in the reduction of the sulphate by organic carbon may be represented as follows:

$$2C_6H_{12}O_6+6SO_4\!-\!+9H\!+\! \rightarrow 12CO_2+12H_2O+3H_2S+3HS\!-\!$$

1 mole of $SO_4$ is reduced upon reaction with $1/3$ mole of organic carbon. As to the $Fe\!+\!+$, the HS- subsequently reacts with the $Fe\!+\!+$ to form the insoluble iron sulphides FeS or $FeS_2$, which precipitate out. Thus, the soluble $Fe^{++}$ and $SO_4^{--}$ are both removed from solution.

It follows that the theoretical minimum amount of organic carbon required to reduce 1230 tonnes of ferrous sulphate, ie the mass of glucose or cellulose required, is 490 tonnes. Where the carbon is in the form of wood chippings (typically, 70% of wood is utilizable organic carbon) some 695 tonnes of wood chippings are required.

EXAMPLE 3

Groundwater Contaminated by Uranium Oxide

Reduction by Bacterial Action

The soluble hexavalent uranium oxide ion $UO_2^{++}$ is sometimes present in groundwater that has passed through waste from a uranium processing plant.

The contaminated groundwater contains a concentration of, say, 10 mg of $UO_2^{++}$ per liter of the groundwater. In 225 million liters of water, this is a total mass of 2.25 tonnes of the hexavalent oxide ion.

The hexavalent $UO_2^{++}$ ion is capable of being reduced to the insoluble tetravalent state, and of being precipitated as insoluble uranium oxides and other tetravalent uranium minerals. The reduction occurs in an environment which promotes the anaerobic decomposition of organic matter.

The relevant biochemical reaction may be represented as follows:

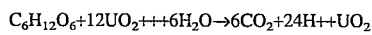
$$C_6H_{12}O_6 + 12UO_2^{++} + 6H_2O \rightarrow 6CO_2 + 24H^+ + UO_2$$

The $UO_2$, being a tetravalent insoluble oxide, precipitates.

$\frac{1}{12}$ mole of glucose or cellulose ($C_6H_{12}O_6$) is required to reduce each mole of $UO_2^{++}$. It follows that the theoretical minimum quantity of organic carbon required to cause the reduction of 2.25 tonnes of $UO_2^{++}$ is 125 kg. When the organic carbon is in the form of wood chippings, 179 kg of wood chippings are theoretically required.

These examples may now be reviewed as follows.

In Example 1, to treat the typical plume of chromium contaminated water, the theoretical minimum quantity of active material (pyrite) that is required to be put in the trench is 1.04 tonnes of pyrite. In Example 2, to treat a typical plume of groundwater contaminated with ferrous sulphate, at least 695 tonnes of wood chippings are required. In Example 3, to treat a typical plume of uranium-contaminated groundwater, at least 179 kg of wood chippings are required.

The density of pyrite is about 5 tonnes per cubic meter. The density of wood chippings is about 0.5 tonnes per cu m. Thus, in Ex 1, 1.04 tonnes of pyrite occupies a volume of 0.21 cu meters. In Ex 2, 695 tonnes of wood chippings occupies a volume of 1390 cum. In Ex 3, 179 kg of wood chippings occupies a volume of 0.36 cu m.

As will be understood, these quantities of materials occupy quite different volumes: in Example 1, the theoretical 1.04 tonnes of iron pyrite occupies 0.014% of the volume of the trench; in Example 2, the theoretical 695 tonnes of wood chippings occupies 92% of the volume of the trench; and in Example 3, the theoretical 179 kg of wood chippings occupies 0.025% of the volume of the trench.

Thus, it is recognised that, for a typical size of plume, the most practical size of trench has a volume which is ample for containing enough material to treat contaminants which are harmful when present in "trace" quantities, as in Examples 1 and 3.

Although theory indicates that only small quantities of the active material are needed, in practice a margin of extra material must be provided, for the following reasons.

1. The extra material, though theoretically redundant, is needed because the reactions do not take place instantly the moment the contaminant comes into contact with the active material. The reactions take time, and meanwhile the water is moving relative to the curtain.

2. If the active material were to be thinly dispersed, a molecule of the contaminant might pass through the curtain without coming close to the active material. Also, it would not be practical to disperse the active material evenly over the whole trench if the material had to be dispersed very thinly.

3. The active material which is introduced into the trench (from above ground) will often contain some components that are more readily reduced than the contaminant, and these components must be taken out before the contaminant reduction operation can commence.

4. The bacteria which give rise to the biochemical reactions involving organic carbon are only viable under the right conditions. One of these conditions is that the organic carbon not be dispersed too thinly. Thus, wood waste in the form of very thinly dispersed sawdust, for example, might not provide viable bacteria.

5. Sometimes the groundwater itself contains slightly oxidised material or contains dissolved oxygen. Extra active material can then be required, in order to ensure the removal of all traces from the groundwater of components that can potentially supply oxygen. One of the reasons a contaminant can be difficult to break down is that the oxygen-containing component of the contaminant is highly stable, and the reduction of the contaminant can only commence when all other more reactive sources of oxygen have been removed. Carrying out such treatment underground is very cost-effective, since oxygen exclusion and long residence times are achieved virtually for nothing.

6. The usual reasons for providing a safety margin apply also, ie that measurements might be inaccurate, and that the assumptions on which calculations are based might not be quite valid.

Some of the factors referred to above are more applicable to the "trace" contaminants than to the "bulk" contaminants. It is recognised in fact that the margin of extra material should be much greater when the contaminant is a trace contaminant than when the contaminant is a bulk contaminant.

In the invention, the size of the trench is, at least to some extent, determined by the process by which the trench is excavated: as described, it would not be practical to make the trench any smaller, even when only a tiny quantity of active material is needed.

Some of the materials likely to be selected as active materials for use in reducing (or indeed oxidising) contaminants are the kinds of materials that tend to lose permeability over a period of time. Some reactive materials will tend to consolidate, and lose porosity, and therefore should be mixed with a filler material which will tend to remain permeable, such as sand/gravel. The grain size, etc, of the filler material, relative to the active material, should be such as will promote the maintenance of permeability. Wood-waste should be mixed with filler material for this reason: the active material should not become so dispersed, however, as mentioned, that the viability of the bacteria might become affected.

For all these reasons, it is recognised that a much larger proportion of excess of active material is required when the contaminant is a trace contaminant, like chromium oxide or uranium oxide, than when the contaminant is a bulk contaminant, like ferrous sulphate. The invention therefore lends itself especially to cases where the contaminant is a trace contaminant, ie a contaminant that is hazardous even in trace quantities.

On the other hand, the invention is applicable to the treatment of bulk contaminants, and to the treatment of bulk acidity. Although the "standard" trench does not seem to have much of an excess of material over that theoretically required to deal with a bulk contaminant, the actual quantity of material needed is unlikely to differ by a factor of more than two or three times. If, in an extreme case, three trenches have to be provided, that is not too damaging on cost grounds. As mentioned, the second and third trenches can be provided later, if it turns out they are needed. Compared with the cost of taking the water out of the ground, the savings are still considerable.

The wood chippings should not be shredded too small. In some cases sawdust-sized particles are applicable, but generally the pieces of wood should rather be of the 1 to 5 cu cm size. Again, this requirement of the bacteria for the larger sizes means that more than the minimum amount of material is needed.

The smaller the concentration of the contaminant, the greater the margin of excess active material should be. If only the small quantity of the active material were provided, the particles of the material would be widely dispersed, and the molecules of the contaminant might not go near the active particles. Also, the micro-biological reactions take time, and if the particles were widely dispersed the contaminants might pass through the curtain without spending much time in contact with the active material.

Of course, it is not practically possible to distribute 1 tonne of pyrite evenly over a curtain that is 1500 sq m in area, and 1 m thick, and the engineer will inevitably provide far more than 1 tonne of pyrite. However, pyrite, if available at all at the site, will be very copiously available, so that providing the excess involves little extra cost.

It may be noted that as time goes by the active material will become depleted. When wood chippings are employed in the reduction of tailings-derived sulphate, for example, the volume of the final precipitants is less than a tenth of the volume of the initial wood chippings. The trench can therefore be expected to fall in, after a period of time. This leads to a number of problems: first, of course, the resulting depression in the ground can constitute a physical hazard; second, the lowering of the ground surface can allow a quantity of oxygen to filter through from above to the active material in what was an anaerobic zone; and third, the groundwater may be able to flow over and around, and therefore bypass, the depleted curtain.

It is likely to be the case therefore that when the in-ground curtain is used to treat a bulk contaminant that some attention might have to be given to monitoring the operation. If necessary, the material in a trench can be topped up, or a further trench can be dug. It is recognised, however, that even in the case of the treatment of bulk contaminants that the total number of trenches is a manageable two or three, and not thirty: if thirty trenches were needed, the system would hardly be economical.

The designer of the treatment system, faced with the task of treating a particular contaminant, seeks to determine whether a proposed reductant will in fact serve to lower the concentration of the contaminant down to an acceptable or authorised level. This predication can be made using the NERNST Equation, in the manner as will now be described.

As an example, the proposed installation is considered, where the contaminant is chromate, and the intended treatment material is elemental iron. The NERNST Equation can be used to determine whether the iron is a powerful enough reductant to lower the concentration of the chromate.

The reaction equation for the reduction of the chromate is:

$$CrO_4^{2-} + 4H_2O + 3e^- \rightarrow Cr(OH)_3 + 5(OH)^-$$

The reduction of the chromate is paralleled by the corresponding oxidation of the iron: $Fe^0 \rightarrow Fe^{2+} + 2e^-$ The designer may consult tables (for example IUPAC tables of equilibrium constants for redox reactions) to ascertain the standard electrode potential in respect of the reduction of Cr(VI) to Cr(III). Under typical in-ground conditions, the value for V may be +560 millivolts. He may also determine that, under the conditions, the value of V for the oxidation of Fe to $Fe^{2+}$ is +447 volts These two reaction statements may be combined:

$$2CrO_4^{2-} + 3Fe^0 + 8H_2O \rightarrow 2Cr(OH)_3 + 3Fe^{2+} + 10(OH)^-$$

and the V in respect of the whole reaction is +1007 mV.

The Nernst equation describes the thermodynamic relation of the redox potential to the composition of the solution. The equation can be used to determine theoretically whether a proposed reaction will proceed in the direction to lower the concentration of the dissolved contaminant to below danger levels.

The Nernst equation is $$E = E_0 - (RT/nF).\log n(\text{con-products/con-reactants})$$

where: $E_0$ is the standard electrode potential (as determined above) for the reaction; RT/nF is the gas constant; and con-products and con-reactants are the concentrations of the products in solution and the concentrations of the reactants in solution, respectively, raised to the power of their stoichiometric coefficients, and expressed in mols per liter. (Considering the level of accuracy and the nature of the calculations to be carried out in the context of treating groundwater in the manner described herein, it may be assumed for the purposes of the equation that concentrations and thermodynamic activites are equal.)

In the case of the above chromate-reduced-by-iron reaction, the equation is $$E = 1007 - 22.7 \times \log n(con \text{ of } Fe^{2+})^3 (con \text{ of } (OH)^-)^{10}/(con \text{ of } CrO_4^{2-})^2$$

In assessing the concentrations of products and the reactants, precipitated solids and water itself can be assumed to be unity, and are not included in the equation;
in neutral pH, the concentration of $(OH)^-$ is assumed to be $10^{-7}$ mols/liter; the concentration of iron may be assumed to be, say, $$20 \, ppm = 3.58 \times 10^{-4} \text{ mols/liter}$$

Putting these values in the Nernst Equation, and following the calculation through, it will be seen that the concentration of $CrO_4^{2-}$ that would put E equal to zero is several orders of magnitude below the acceptable or authorized (drinking water) limit for chromate. Therefore, the reaction is thermodynamically favoured, to lower the concentration of the chromate, and is so favoured down to even minute traces of chromate.

The designer of the system requires that the substances resulting from the reaction will include a solid form of the now-reduced contaminant, which will precipitate out of solution. In order to determine the solubility of the resultants, the available tables for indicating solubilities under standard conditions may be consulted; or, the solubility may be determined using the Gibbs free energy equation.

In the case of the chromate reduction as described, it is necessary to consider the solubility of chromium hydroxide, $Cr(OH)_3$. It may be determined that the solubility product of $Cr(OH)_3$ is $10^{-37.31}$. At a neutral pH, if the calculation is followed through, it will be determined that the concentration at which chromium hydroxide precipitates is several orders of magnitude lower than water quality criteria, because chromium hydroxide is virtually completely insoluble at neutral pH. Therefore, the resultant of the chromate-reduction-by-iron reaction, chromium hydroxide, will precipitate.

From the above calculations, the designer has determined that it is thermodynamically favoured that the concentration of chromate will be driven lower, even when the concentration is already tiny. He has also determined that the resultant chromium hydroxide will readily precipitate out of solution. Therefore, the theoretical indications are that the breakdown reaction should proceed very well.

The Equations say nothing about flow-rates, however, and so it remains to determine whether the reaction will take place at the in-ground flow rate, such that there is sufficient residence time for the water to be in contact with the iron long enough for the reduction reaction to be completed. The best approach to this aspect, once the theoretical predictions from the equations are shown to be favourable, is simply to try out the reaction in a laboratory experiment, where the velocity of the groundwater can be simulated.

Another aspect that can be explored is the manner in which the precipitate appears: if the precipitate appears as a coating on the particles of iron, the reducing action of the iron might be inhibited over a period of time, or the precipitate might clog the treatment material, making it less permeable to the passage of water therethrough. Again, laboratory experiments can settle this question.

The direct reduction of the contaminant by the use of elemental iron (or some other reductant such as pyrite, or such as organic carbon) has been described. The reduction reaction produces a resultant which is very much less soluble than the contaminant, whereby the resultant precipitates out of solution, and loses mobility, and in fact from then on the resultant remains stationary in the ground. In the resultant precipitant, the contaminant metal is present in a reduced-valency form of the metal.

Metals that may be expected to be reduced by elemental iron and precipitate as insoluble solids include the oxidized forms of Cr, U, Tc, Hg, Se, Cu, V, Mo, Pu, Np, Te, Po, Ag, Pd, Rh. In the dissolved high-oxidation-state oxidised forms, many of these elements form oxyanions and are highly mobile under many groundwater conditions. Reduction of these elements generally lowers the mobility substantially under typical groundwater pH conditions, whereby, upon reduction, precipitation of the lower oxidation-reduction-state form can be expected.

Examples of the specific reduction reactions that can be utilised are:

Cr(VI) to Cr(III), insoluble precipitant: Cr(III) hydroxide

U(VI) to U(IV), insoluble precipitant: $UO_2$

Tc(VII) to Tc(IV), precipitant: an insoluble Tc(IV) phase

Hg(II) to Hg(I) or Hg(O), precipitant: insoluble Hg(I/O) phase

Se(VI) or Se(IV) to insoluble Se(O) or Se(-2) precipitates

Cu(II) to Cu(O), which is insoluble

V(V) to V(IV) or V(III), which are insoluble

Pu(V, VI) to insoluble Pu(IV) NB: Pu (III) is soluble

Np(V) to Np(IV), precipitant: an insoluble Np(IV) phase

Te(IV) to Te(O), which is insoluble

Po(II) to Po(O), which is insoluble

Ag(I) to Ag(O), which is insoluble

Pd(II) to Pd(O), which is insoluble

Rh(III) to Rh(O), which is insoluble

In place of elemental iron, other solid-phase reductants may be used, such as zinc filings, Fe(II)-containing solids such as siderite, pyrite, greigite, biotite, glauconite, and Mn(II)-containing solids such as rhodochrosite. These other reductants may be expected also to reduce the above-listed dissolved metals, and may be more effective or more economical than elemental iron. It should be noted that under flowing groundwater conditions two seemingly equivalent reductants can perform differently, and the designer will find it generally prudent to confirm the effectiveness of a particular proposed reductant in laboratory experiments before placing many tonnes of the reductant material in the ground.

When the contaminant is $SeO_4^{2-}$ or $SeO_3^{2-}$, and others, organic matter may be added to promote bacterial reduction. Removal of dissolved Se can be facilitated through precipitation of $Se^0$ or a number of $Se^{2-}$-containing solids.

In the case where the plume contains sulphate, the precipitation of the metal contaminant can take place indirectly. First, the sulphate may be reduced to sulphide (by bacterial action arising from organic carbon, for example); then, the metal sulphide is formed, which is insoluble, and precipitates.

The metals that can be expected to be precipitated, in consequence of the reduction of sulphate are Fe, Co, Ni, Cu, Zn, As, Se, Mo, Pb, Pd, Ag, Cd, Sb, W, Re, Os, Ir, Pt, Hg, Bi, Sn.

In fact, the indirect precipitation of the contaminant metal in the form of reduced sulphide solids can be deliberately invoked even if there is no sulphate in the water, by adding a sparingly soluble sulphate solid, such as gypsum. The gypsum may be added to the reactant, or may be placed in a pre-treatment zone.

Sulphides generally should not be allowed to re-oxidise, as the oxidation product would then re-enter solution. However, the precipitation of sulphides in non-mobile form, whereby the sulphide remains immobile in the body of solid treatment material, underground, anoxic, and isolated from the environment, is an advantageous mode of disposal and storage of the contaminant. Many other contaminants, the lower-oxidation-state insoluble forms of which also must not be allowed ever to oxidise, benefit from the free disposal and storage of the precipitant in the treatment material.

Although the reactions have been described as including both oxidation and reduction of the dissolved contaminant, in fact the reduction reaction is very much preferred, in the invention. Because the reaction takes place under ground, and under water, and in conditions which can be entirely passive, the use of anaerobic or anoxic reactions are so much more favoured. Besides, it is common for the reduced form of a contaminant metal to be much less soluble than the higher-oxidation-state form. However, there are cases where the reaction is more favoured in the oxidation direction, and wherein the higher-oxidation state form is the less soluble, and these are not ruled out of the invention. In an oxidation reaction, of course, no advantage can be taken of the fact that conditions below the water table generally are inherently anaerobic.

As described, the active treatment material may be placed in the ground in the path of the plume by excavating a trench, and placing the material in the trench. The designer may consider other ways of placing the material in the ground, which might be more economical than trenches.

For example, instead of excavating a trench, using a mechanical hoe, a hollow stem auger may be used to drill a series of close-spaced holes, the material being injected into the hole through the hollow stem as the auger is withdrawn. The augers may be arranged in gangs of, say, five augers.

There are a number of down-hole mixing techniques which the designer might consider. For example, iron may be injected or pumped into the ground, using an injection pipe, or using a hollow-stemmed auger, when the iron is in the form of very fine particles, and suspended in water or other fluid.

It is sometimes possible to excavate aquifer material by the use of jetted liquids, and this technique can lend itself to the simultaneous injection of fine particles which may be suspended in the liquid.

The designer should consider the porosity of the active material once it is installed: the porosity of the material should preferably be greater than that of the surrounding aquifer material, whereby the material offers no barrier to the flow of groundwater. Some installation techniques will leave the material with good porosity: other techniques may tend to consolidate the material. The designer should consider that it is likely that some settling and consolidation of the material will occur with time, and also some filling-in of the matrix of the material may occur as the precipitates accumulate.

In the context of the invention, the expression "receptacle" for the body of material should be understood in the sense of a defined space or cavity within the aquifer, rather than in the sense of a physical container.

Besides the active treatment material, and the sand/gravel filler material which will usually also be installed, the designer may install a catalyst material to increase the rate of the reduction reaction. Again, the catalyst material must be solid phase, and should be such as to ensure the correct overall porosity. An example of a catalyst material is elemental palladium (Pd).

It has been mentioned that one of the major advantages associated with the treatment systems as described is the fact that the system can be set up so as to require no input, i.e nothing at all; not even inspection. On the other hand, in many cases, the addition of extra energy can serve to speed up a sluggish reduction reaction, and especially it can be the case that an input of energy can start or boost a reaction, and the reaction then proceeds effectively. The added energy may be in the form of heat or electricity.

We claim:

1. Procedure for treating contaminated groundwater in-situ in its native aquifer, wherein:

the procedure includes the step of determining the nature of, the extent of, and the velocity of, a plume of dissolved contaminant within a body of groundwater travelling through an aquifer;

the procedure includes the step of selecting and providing a body of active material;

the procedure includes the step of forming, in the material of the aquifer, a receptacle or cavity which is suitable for receiving the body of active material, and of placing the said body in the receptacle;

the procedure includes the step of so locating the said receptacle that the active material therein lies in the path of the plume;

the arrangement of the receptacle being such that the plume enters the receptacle through an upstream side thereof, and emerges from the receptacle through a downstream side thereof, the arrangement being such that natural gradients of the aquifer in which the receptacle is located cause the plume of contaminated groundwater to pass from the aquifer into the receptacle, pass through the receptacle from side to side thereof, and emerge into the aquifer from the downstream side thereof;

the body of active material in the receptacle is of such porosity and permeability that resistance to the passage of groundwater through the receptacle and through the body of material in the receptacle is substantially no greater than the resistance of the native aquifer to the passage of groundwater through the aquifer;

the body of active material is active in the sense that the presence of the material in substance causes the dissolved contaminant to be removed from the groundwater;

the chemical or biochemical nature of the active material in relation to the chemical or biochemical nature of the contaminant is such that at least prolonged operative contact of the groundwater with the active material is effective to cause a change in the oxidation-reduction state by chemical or biochemical reaction of at least a substantial proportion of the dissolved contaminant into a substance which is substantially solid and insoluble in the groundwater, and which is retained in the active material.

2. Procedure of claim 1, wherein the said change in the oxidation-reduction state is the kind of reaction that takes place substantially only under anaerobic conditions.

3. Procedure of claim 1, wherein:

the active material in the receptacle is mixed with a quantity of sand/gravel;

whereby the permeability of the resulting mixture in the receptacle is no less than the permeability of the surrounding aquifer.

4. Procedure of claim 1, wherein the active material in the receptacle is mixed with a quantity of a substance which, in relation to the contaminant, is an adsorbent.

5. Procedure of claim 1, wherein:

the receptacle is in the form of a trench, excavated down into the material of the native aquifer from the ground surface;

and, in relation to the natural water table of the aquifer, in the region of the trench, the body of active material is located, in the trench, below the said water table.

6. Procedure of claim 5, wherein:

the contaminant is termed a bulk contaminant, and the said determinations indicate that the theoretical minimum quantity of active material required to change the oxidation-reduction state of the said bulk contaminant is M tonnes;

and the procedure includes the step of inserting into the trench a quantity of active material only marginally greater than M tonnes.

7. Procedure of claim 6, wherein:

the procedure includes the step of providing a further such trench, located down-gradient of the said trench, and of placing a further quantity of the active material in the further trench;

and the arrangement of the trenches is such that the trenches are not in physical connection with each other.

8. Procedure of claim 7, wherein the steps of providing the further trench, and of placing the further active material therein, are carried out after the said trench has been in place and in operation for a substantial period of time.

9. Procedure of claim 6, wherein the contaminant is dissolved ferrous sulphate, and the active material is organic carbon.

10. Procedure of claim 5, wherein:

the contaminant is a trace contaminant, and the said determinations indicate that the theoretical minimum quantity of active material required to change the oxidation-reduction state of the said bulk contaminant is m tonnes;

and the procedure includes the step of inserting into the trench a quantity of active material many times in excess of m tonnes.

11. Procedure of claim 10, wherein the contaminant is dissolved chromium oxide, and the active material is iron pyrite.

12. Procedure of claim 10, wherein the contaminant is dissolved hexavalent uranium oxide, and the active material is organic carbon.

13. Procedure of claim 10 wherein the contaminant is dissolved chromium oxide, and the active material is iron metal.

14. Procedure of claim 10 wherein the contaminant is hexavalent uranium oxide, and the active material is iron metal.

15. Procedure of claim 5, wherein the procedure includes the step of providing a well down-gradient of the trench, and of so operating the well as to enhance the pressure gradient acting to urge groundwater to pass through the trench.

16. Procedure of claim 1, wherein:

the groundwater includes water that has passed through exposed mine tailings, and the contaminant comprises acidity in the said water;

and the active material in the excavation comprises organic carbon.

17. Procedure of claim 16, wherein the organic carbon is in the form of small pieces of wood.

18. Procedure of claim 1, wherein the contaminant is a dissolved metallic element in an oxidised form in which the element forms oxyanions and is highly mobile under groundwater conditions, and wherein reduction of the element substantially lowers the mobility thereof.

19. Procedure of claim 1, wherein the contaminant is in the form of a metal of a higher oxidation-reduction state, and the breakdown reaction comprises a reduction of the higher oxidation-reduction-state metal to a lower oxidation-reduction state, followed by precipitation of an insoluble lower oxidation-reduction state phase.

20. Procedure of claim 19, wherein the contaminant is one of Cr, U, Tc, Hg, Se, Cu, V, Mo, Pu, Np, Te, Po, Ag, Pd, Rh.

21. Procedure of claim 20, wherein the active material is iron metal.

22. Procedure of claim 1, wherein:

a pre-determined authorized maximum concentration of the dissolved contaminant is C;

the chemical nature and disposition of the treatment material are such that the breakdown reaction, upon taking place, is effective to lower the concentration of the contaminant in the groundwater and raise the concentration of the resultant substance;

the chemical nature and disposition of the treatment material are such that the breakdown reaction is thermodynamically favoured, as determined by the NERNST Equation of the breakdown reaction, to take place at a concentration of the contaminant that is less than the authorised maximum concentration C of the contaminant;

the treatment material is of such a chemical nature that the solubility of the said resultant substance in the groundwater is so low that only a small-enough-to-be-authorised concentration of the substance can remain in solution;

whereby any excess of the residual substance resulting from the reaction is precipitated out of solution.

23. Procedure of claim 22, wherein the dissolved contaminant is chromium tetroxide (chromate), $CrO_4^{2-}$, containing hexavalent chromium; and the treatment material is iron; and the residual material precipitated out of solution is chromium hydroxide, $Cr(OH)_3$, containing trivalent chromium.

24. Procedure of claim 1, wherein the step of selecting and providing a body of active material comprises the following steps:

of proposing a test treatment material;

in respect of that test material, of determining whether the breakdown reaction of the contaminant with the test material is thermodynamically favoured, as determined by the NERNST Equation, at a concentration of the contaminant below the authorised concentration;

of determining whether the solubility of the resultant is small enough that only a small-enough-to-be-authorized concentration of the resultant substance goes into solution, and any excess of the resultant is precipitated;

of selecting the test material for use in the receptacle on the basis of both the said determinations being positive.

25. Procedure of claim 24, wherein the procedure includes the step of carrying out laboratory tests to determine whether the reaction is completed under flowing-groundwater conditions.

26. Procedure of claim 1, wherein, in addition to the dissolved contaminant, sulphate is also present in the groundwater;

the contaminant is a dissolved metal selected from the list consisting of Fe, Co, Ni, Cu, Zn, As, Se, Mo, Pd, Ag, Cd, Sb, W, Re, Os, Ir, Pt, Hg, Pb, Sn, Bi;

the treatment material is organic carbon;

whereby the breakdown reaction is indirect in relation to the contaminant, in that the organic carbon leads to bacterial reduction of $SO_4^-$ to $HS^-$, and thence to the precipitation of the metal as an insoluble sulphide solid.

27. Procedure of claim 1, including the step of adding sulphate to the water in the form of a sparingly soluble solid;

the contaminant is a dissolved metal selected from the list consisting of Fe, Co, Ni, Cu, Zn, As, Se, Mo, Pd, Ag, Cd, Sb, W, Re, Os, Ir, Pt, Hg, Pb, Sn, Bi;

the treatment material is organic carbon;

whereby the breakdown reaction is indirect in relation to the contaminant, in that the organic carbon leads to bacterial reduction of $SO_4^-$ to $HS^-$, and thence to the precipitation of the metal as an insoluble sulphide solid.

28. Procedure of claim 1, wherein the procedure includes the step of making the receptacle or cavity in the ground by the use of a hollow stemmed auger, and of inserting the material in the aquifer through the hollow stem of the auger.

29. Procedure of claim 1, wherein the procedure includes the step of adding a solid-phase, particulate-form, catalyst material into the receptacle.

30. Procedure of claim 1, wherein the procedure includes the step of enhancing the change in oxidation-reduction state by the additon of energy into the body of active material.

* * * * *